United States Patent
Yamagishi et al.

(10) Patent No.: US 9,599,818 B2
(45) Date of Patent: Mar. 21, 2017

(54) OBSTACLE AVOIDANCE APPARATUS AND OBSTACLE AVOIDANCE METHOD

(71) Applicant: Sony Computer Entertainment Inc., Tokyo (JP)

(72) Inventors: Takeshi Yamagishi, Kanagawa (JP); Hiroshi Osawa, Kanagawa (JP); Yoichi Nishimaki, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 197 days.

(21) Appl. No.: 13/804,240

(22) Filed: Mar. 14, 2013

(65) Prior Publication Data

US 2013/0328928 A1    Dec. 12, 2013

(30) Foreign Application Priority Data

Jun. 12, 2012 (JP) ................. 2012-133224

(51) Int. Cl.
G02B 27/01 (2006.01)
A63F 13/98 (2014.01)

(52) U.S. Cl.
CPC ............ *G02B 27/017* (2013.01); *A63F 13/02* (2013.01); *A63F 2300/204* (2013.01); *A63F 2300/301* (2013.01); *A63F 2300/69* (2013.01); *G02B 2027/014* (2013.01); *G02B 2027/0138* (2013.01)

(58) Field of Classification Search
CPC .................................................. G02B 27/017
USPC ........................................................ 345/633
See application file for complete search history.

(56) References Cited

U.S. PATENT DOCUMENTS

| 4,952,024 | A  |   | 8/1990  | Gale |
| 5,900,849 | A  | * | 5/1999  | Gallery ............................ 345/8 |
| 6,227,974 | B1 | * | 5/2001  | Eilat ..................... A63F 13/005 |
|           |    |   |         | 273/148 B |
| 6,657,627 | B1 |   | 12/2003 | Wada |
| 6,951,515 | B2 | * | 10/2005 | Ohshima et al. ............... 463/31 |
| 7,808,450 | B2 |   | 10/2010 | Wanda et al. |
| 2004/0150666 | A1 |   | 8/2004 | Fager |

(Continued)

FOREIGN PATENT DOCUMENTS

| CN | 1191345 A   | 8/1998 |
| CN | 101243392 A | 8/2008 |

(Continued)

OTHER PUBLICATIONS

Office Action for corresponding JP application No. 2012-133224, dated Feb. 4, 2014.

(Continued)

*Primary Examiner* — Devona Faulk
*Assistant Examiner* — Hai Tao Sun
(74) *Attorney, Agent, or Firm* — Matthew B. Dernier, Esq.

(57) ABSTRACT

An obstacle detecting unit detects an obstacle for a user wearing a head mounted display from an image of the outside world. A distance calculating unit calculates the distance from a detected obstacle to the user wearing the head mounted display. An obstacle replacing unit replaces the detected obstacle with a virtual object. A virtual object synthesizing unit generates a virtual object at a position within a virtual space displayed on the head mounted display, in which the position is determined according to the distance to the obstacle.

13 Claims, 8 Drawing Sheets

(56) References Cited

U.S. PATENT DOCUMENTS

| | | |
|---|---|---|
| 2006/0273984 A1* | 12/2006 | Wanda et al. .................... 345/7 |
| 2010/0164990 A1 | 7/2010 | Van Doorn |
| 2010/0305724 A1 | 12/2010 | Fry |
| 2012/0124509 A1* | 5/2012 | Matsuda ................ G06F 3/011 715/782 |
| 2012/0194554 A1* | 8/2012 | Kaino et al. .................. 345/633 |

FOREIGN PATENT DOCUMENTS

| | | |
|---|---|---|
| JP | 2006-301924 A | 11/2006 |
| JP | 2012-155655 A | 8/2012 |

OTHER PUBLICATIONS

Office Action for corresponding CN application No. 201310149396.1, dated Aug. 13, 2015.

* cited by examiner

OBSTACLE AVOIDANCE APPARATUS AND OBSTACLE AVOIDANCE METHOD

BACKGROUND OF THE INVENTION

1. Field of the Invention

The present invention relates to an apparatus and a method for obstacle avoidance used for a head mounted display.

2. Description of the Related Art

It is common that a user plays a game while wearing a head mounted display connected to a game device on the head, watching the screen displayed on the head mounted display, and operating a controller or the like. With a typical stationary display connected to a game device, since the user's field of vision includes the outside of the display's screen, the user may not be able to concentrate on the screen or the user's feeling of being immersed in the game may be reduced. Wearing a head mounted display, on the other hand, the user only sees images displayed on the head mounted display, so that the user feels more immersed in the world of the images and the entertainment capabilities of the game will be enhanced.

However, since a user wearing a head mounted display cannot see the outside world, the user may bump into an obstacle around the user or may knock something off a desk when stretching a hand or moving the user's body during game play.

SUMMARY OF THE INVENTION

The present invention has been made in view of such a problem, and a purpose thereof is to provide an obstacle avoidance apparatus and an obstacle avoidance method that can avoid the situation where a user wearing a head mounted display bumps into an obstacle.

To solve the problem above, an obstacle avoidance apparatus of an embodiment of the present invention comprises: an obstacle detecting unit configured to detect an obstacle for a user wearing a head mounted display from an image of the outside world; an obstacle replacing unit configured to replace the detected obstacle with a virtual object; and a virtual object synthesizing unit configured to generate the virtual object within a virtual space displayed on the head mounted display.

Another embodiment of the present invention relates to an obstacle avoidance method. The method comprises: detecting an obstacle for a user wearing a head mounted display from an image of the outside world; replacing the detected obstacle with a virtual object; and generating the virtual object within a virtual space displayed on the head mounted display.

Optional combinations of the aforementioned constituting elements, and implementations of the invention in the form of methods, apparatuses, systems, computer programs, data structures, and recording media may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
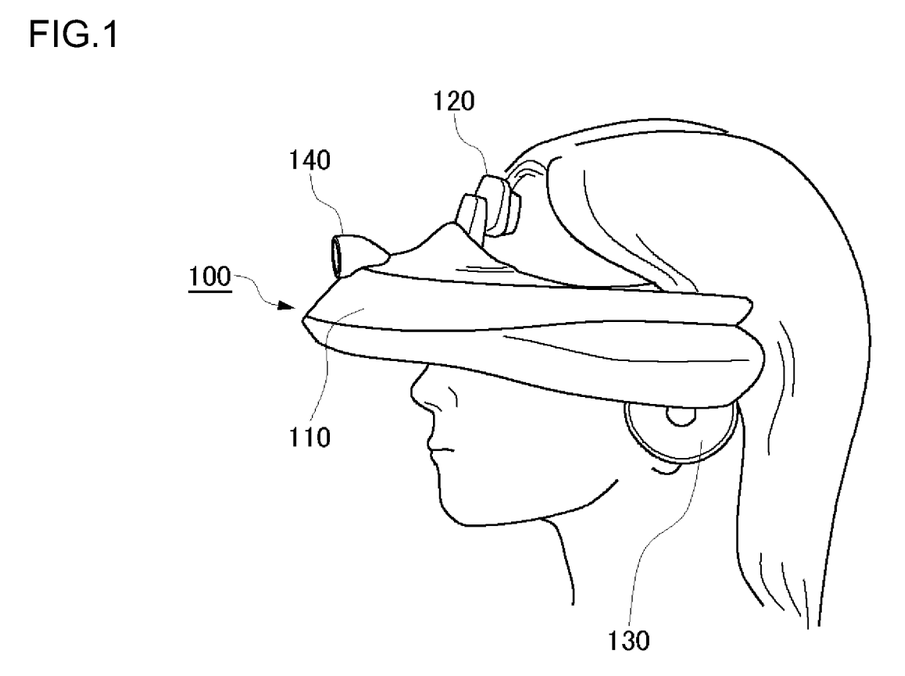
FIG. 1 is an outline view of a head mounted display.

FIG. 1 is an outline view of a head mounted display 100. The head mounted display 100 comprises a main body 110, a frontal region contact unit 120, and a temporal region contact unit 130.

The head mounted display 100 is a display apparatus that is mounted on the head of a user and used to view a still image or a moving image displayed thereon or to listen to sound or music output through the headphones.

Position information of the user can be measured using a position sensor, such as a global positioning system (GPS), embedded in the head mounted display 100 or placed externally. Also, posture information, such as the orientation or tilt of the user's head wearing the head mounted display 100, can be measured using a posture sensor embedded in the head mounted display 100 or placed externally.

The main body 110 includes a display, a position information acquisition sensor, a posture sensor, and a communication apparatus. The frontal region contact unit 120 and temporal region contact unit 130 include a biological information acquisition sensor that can measure the user's biological information, such as the body temperature, pulse, blood components, perspiration, brain waves, and cerebral blood flow.

The head mounted display 100 may further comprise a camera for capturing an image of a user's eye. With the camera mounted on the head mounted display 100, the line of sight, pupil movement, and blinking of the user can be detected.

There will now be described an obstacle avoidance method applied when a user wears the head mounted display 100. The application of the obstacle avoidance method of the present embodiment is not limited to the head mounted display 100 in the narrow sense and is also available to eyeglasses, a glasses-type display, a glasses-type camera, headphones, a headset (headphones with a microphone), earphones, earrings, a ear-hook camera, a headwear, a but with a camera, or a headband.

Figure 2:
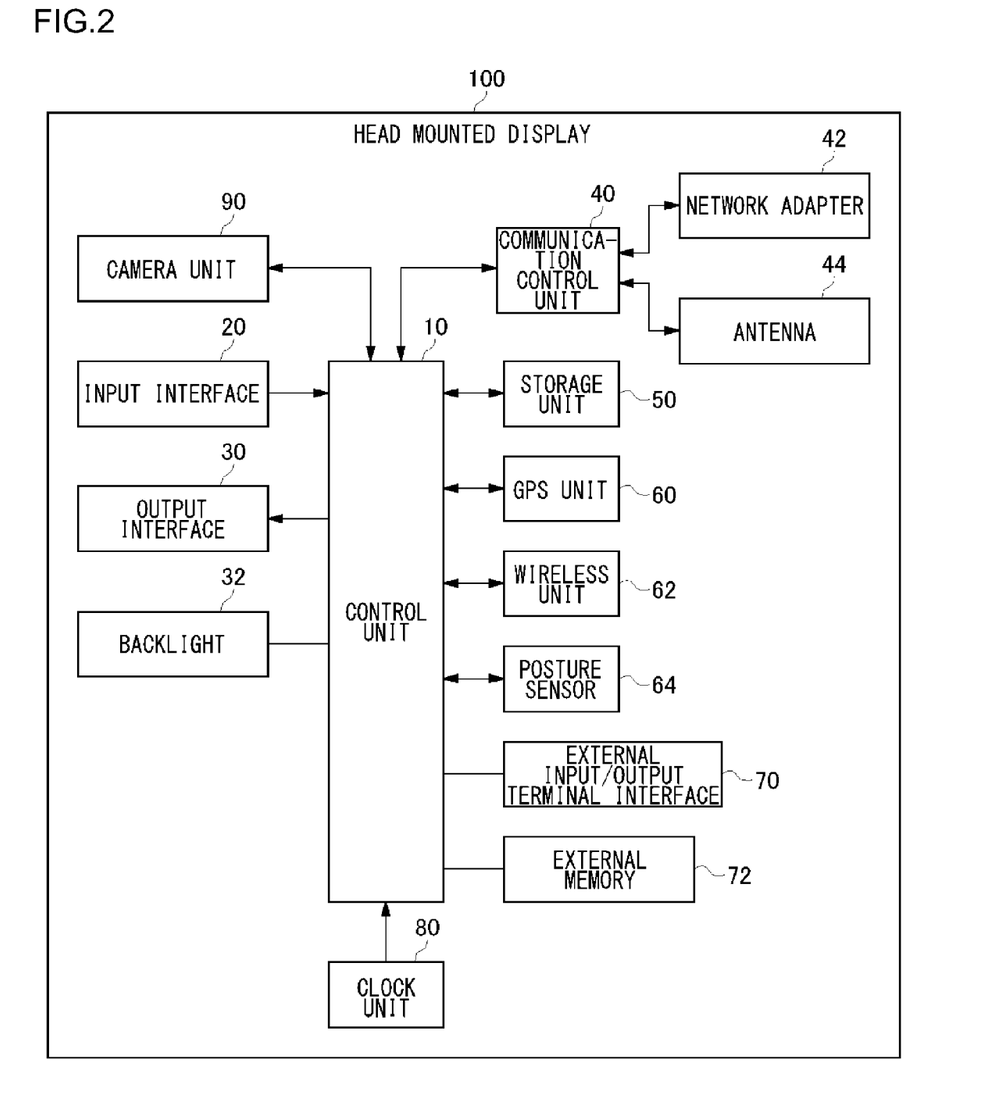
FIG. 2 is a functional configuration diagram of a head mounted display.

FIG. 2 is a functional configuration diagram of the head mounted display 100.

A control unit 10 is a main processor that processes and outputs a signal including an image signal and a sensor signal, an instruction, and data. An input interface 20 receives an operation signal or a setting signal from a touch panel and a touch panel controller and provides the signal to the control unit 10. An output interface 30 receives an image signal from the control unit 10 and displays the image on the display. A backlight 32 provides backlight to the liquid crystal display.

A communication control unit 40 transmits data input from the control unit 10 to the outside through a network adapter 42 or an antenna 44 via wired or wireless communication. The communication control unit 40 also receives data from the outside through the network adapter 42 or antenna 44 via wired or wireless communication and outputs the data to the control unit 10.

A storage unit 50 temporarily stores data, a parameter, an operation signal, and the like processed by the control unit 10.

A GPS unit 60 receives position information from a GPS satellite and provides the information to the control unit 10 according to an operation signal from the control unit 10. Also, a wireless unit 62 receives position information from a wireless base station and provides the information to the control unit 10 according to an operation signal from the control unit 10.

A posture sensor 64 detects posture information including the orientation and tilt of the main body 110 of the head mounted display 100. The posture sensor 64 is implemented by combining a gyro sensor, an acceleration sensor, an angular acceleration sensor, and the like, as needed.

An external input/output terminal interface 70 is an interface through which a universal serial bus (USB) controller or another peripheral device is connected. An external memory 72 is an external memory such as a flash memory.

A clock unit 80 sets time information according to a setting signal from the control unit 10 and provides time data to the control unit 10.

A camera unit 90 includes configurations necessary for shooting, such as a lens, an image sensor, and a range sensor. A range sensor is a sensor that emits infrared light and shoots the reflected light so as to measure the distance to the object based on the principle of triangulation.

The control unit 10 can provide an image or text data to the output interface 30 to display the image or data on the display or can provide such an image or text data to the communication control unit 40 to transmit the image or data to the outside.

Figure 3:
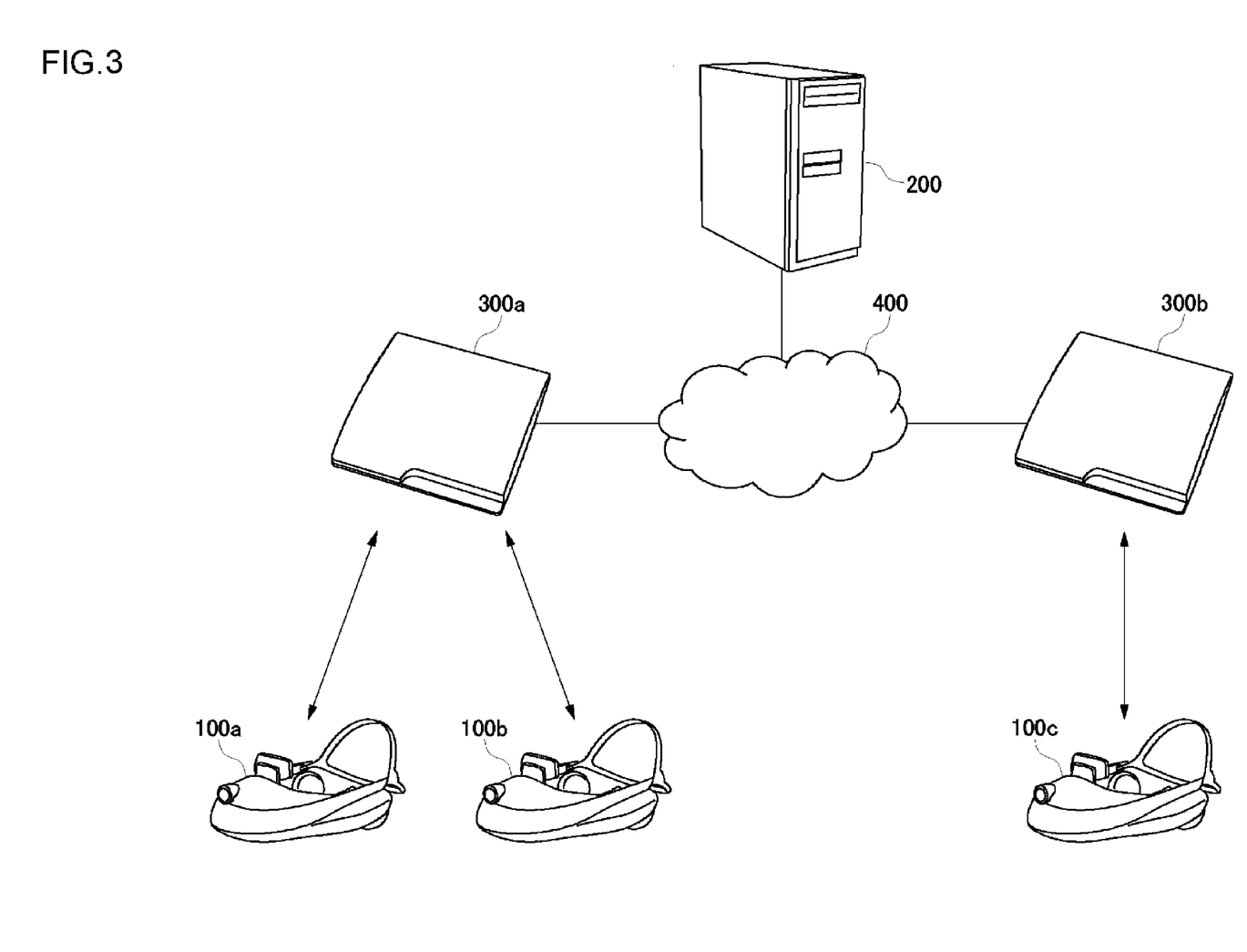
FIG. 3 is a configuration diagram of an obstacle avoidance system according to the present embodiment.

FIG. 3 is a configuration diagram of an obstacle avoidance system according to the present embodiment.

Head mounted displays 100a and 100b of multiple users are connected to a game device 300a through an interface provided to connect a peripheral device with a wireless communication function or a USB peripheral device to the game device 300a. To another game device 300b is connected a head mounted display 100c of another single user.

The game devices 300a and 300b (also collectively referred to as game devices 300) and a server 200 are connected to a network 400. The game devices 300 receive content including a game and a movie from the server 200 via the network 400. The server 200 may also provide to the game devices 300 an online application, such as a game in which multiple users can participate via the network 400.

Figure 4:
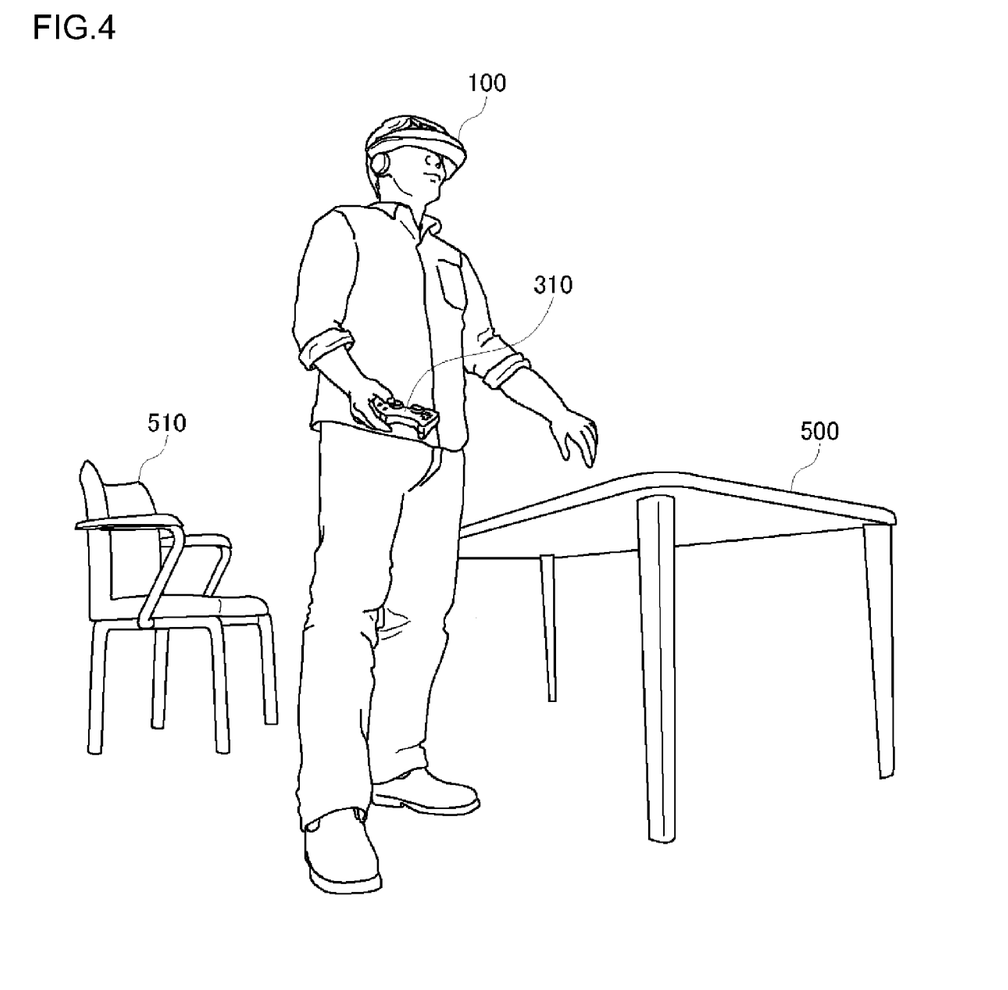
FIG. 4 is a diagram for describing an environment around a user wearing a head mounted display.

FIG. 4 is a diagram for describing an environment around a user wearing the head mounted display 100. The user operates a controller 310 of a game device 300 while wearing the head mounted display 100. Some game applications require a user holding the controller 310 to move a hand or the body of the user. However, since a user wearing the head mounted display 100 cannot see the outside world, the user may bump into a table 500 or a chair 510 and might knock something off the table 500 or get injured.

In the case where the head mounted display 100 is a see-through head mounted display through which the user can also see the outside world besides images, the user can check the surroundings. However, when the user is focused on what is displayed on the screen, the user may not be able to pay enough attention to an obstacle around the user, and hence, the same kind of problem will arise.

In the present embodiment, a real obstacle around the user is detected, replaced by a virtual object, and displayed on the screen of the head mounted display 100, so that the user can naturally avoid the obstacle.

Figure 5:
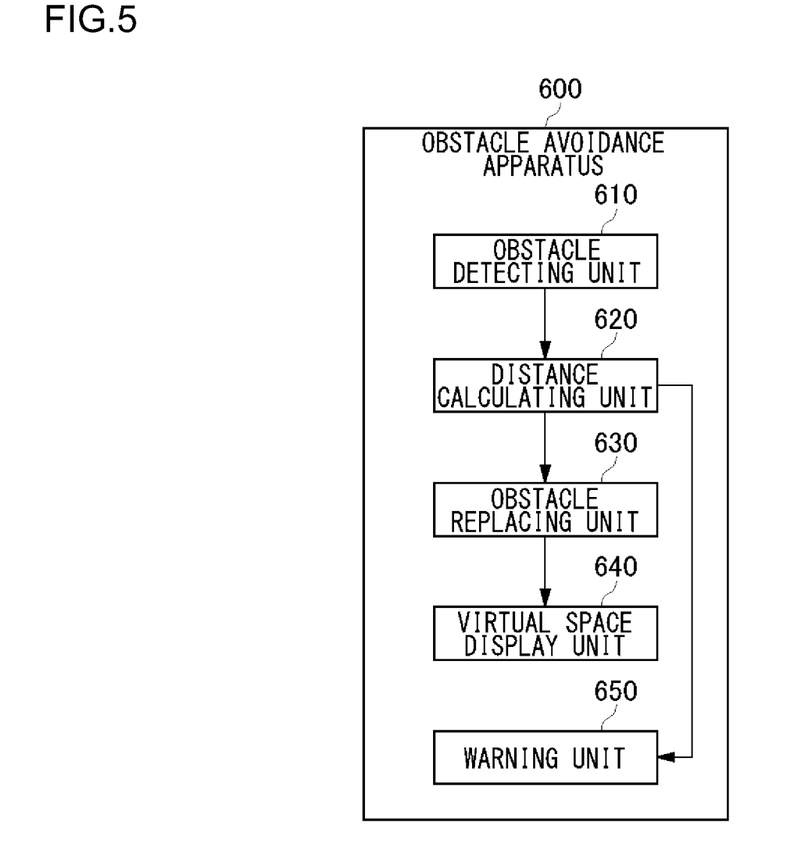
FIG. 5 is a functional configuration diagram of an obstacle avoidance apparatus according to the present embodiment.

FIG. 5 is a functional configuration diagram of an obstacle avoidance apparatus 600 according to the present embodiment. FIG. 5 is a block diagram featuring the functions, and these functional blocks may be implemented in a variety of forms by hardware only, software only, or a combination thereof.

The obstacle avoidance apparatus 600 is basically mounted on a game device 300 to which the head mounted display 100 is connected, but at least part of the functions of the obstacle avoidance apparatus 600 may be implemented by the control unit 10 in the head mounted display 100. Alternatively, at least part of the functions of the obstacle avoidance apparatus 600 may be implemented by the server 200.

An obstacle detecting unit 610 detects an obstacle from an image of the outside world captured by a camera 140 mounted on the head mounted display 100. For the detection of an obstacle, a conventional algorithm for extracting an object from an image is used. By shooting a moving image, the movement of an object can be detected, so that movable objects, such as humans and animals, can be distinguished from stationary objects, such as desks and ornaments. When a camera is not mounted on the head mounted display 100, another camera connected to a game device 300 may be used to capture an image of the outside world so as to detect an obstacle. Also, when an obstacle is to be detected using the camera 140 mounted on the head mounted display 100, obstacles around a user wearing the head mounted display 100 cannot be detected if the user only looks to the front. Accordingly, a message for leading the user to turn the user's head to look around may be displayed on the head mounted display 100.

A distance calculating unit 620 calculates the distance from an obstacle detected by the obstacle detecting unit 610 to the user. The distance from the user to an obstacle can be measured by a range sensor provided in the camera unit 90.

When a user wearing the head mounted display 100 moves, the positional relationship between the user and an obstacle changes. Accordingly, with a predetermined period while the user is wearing the head mounted display 100, the obstacle detecting unit 610 detects an obstacle from a captured image of the outside world and the distance calculating unit 620 measures the distance to the obstacle.

An obstacle replacing unit 630 replaces an obstacle detected by the obstacle detecting unit 610 with a virtual object to be displayed in a virtual space in a game or another application. The size of the virtual object, which is generally determined so as to correspond to the size of the obstacle shot by the camera 140, may be determined according to the distance to the obstacle calculated by the distance calculating unit 620, so that an obstacle located closer to the user may be displayed as a larger virtual object, for example.

A virtual object synthesizing unit 640 renders a virtual object, with which the obstacle replacing unit 630 has replaced an obstacle, within a virtual space in a game or the like and displays the composite image on the head mounted display 100. The virtual space display unit 640 transmits the composite image to the head mounted display 100 via wireless communication or via a USB cable or the like.

The virtual object synthesizing unit 640 may generate a composite image by superimposing a virtual object upon a background image, at a position in a virtual space determined according to the distance to the obstacle acquired by the distance calculating unit 620.

The virtual object is an object in a virtual space to which a user hesitates to get closer, such as a fence, a cliff, a sandbag, a box, and a no-entry sign. It is preferable to select a virtual object that is not unnatural and coordinates with the landscape of the virtual space. By arranging such a virtual object in a virtual space, a user can naturally avoid bumping into a real obstacle corresponding to the virtual object while concentrating on the application such as a game.

The distance calculating unit 620 calculates the distance between the user and an obstacle in real time and, when the distance to an obstacle is less than a predetermined threshold, a warning unit 650 warns the user not to get any closer to the obstacle by allowing the head mounted display 100 to sound an alert or allowing the controller 310 of the game device 300 to vibrate.

Figure 6:
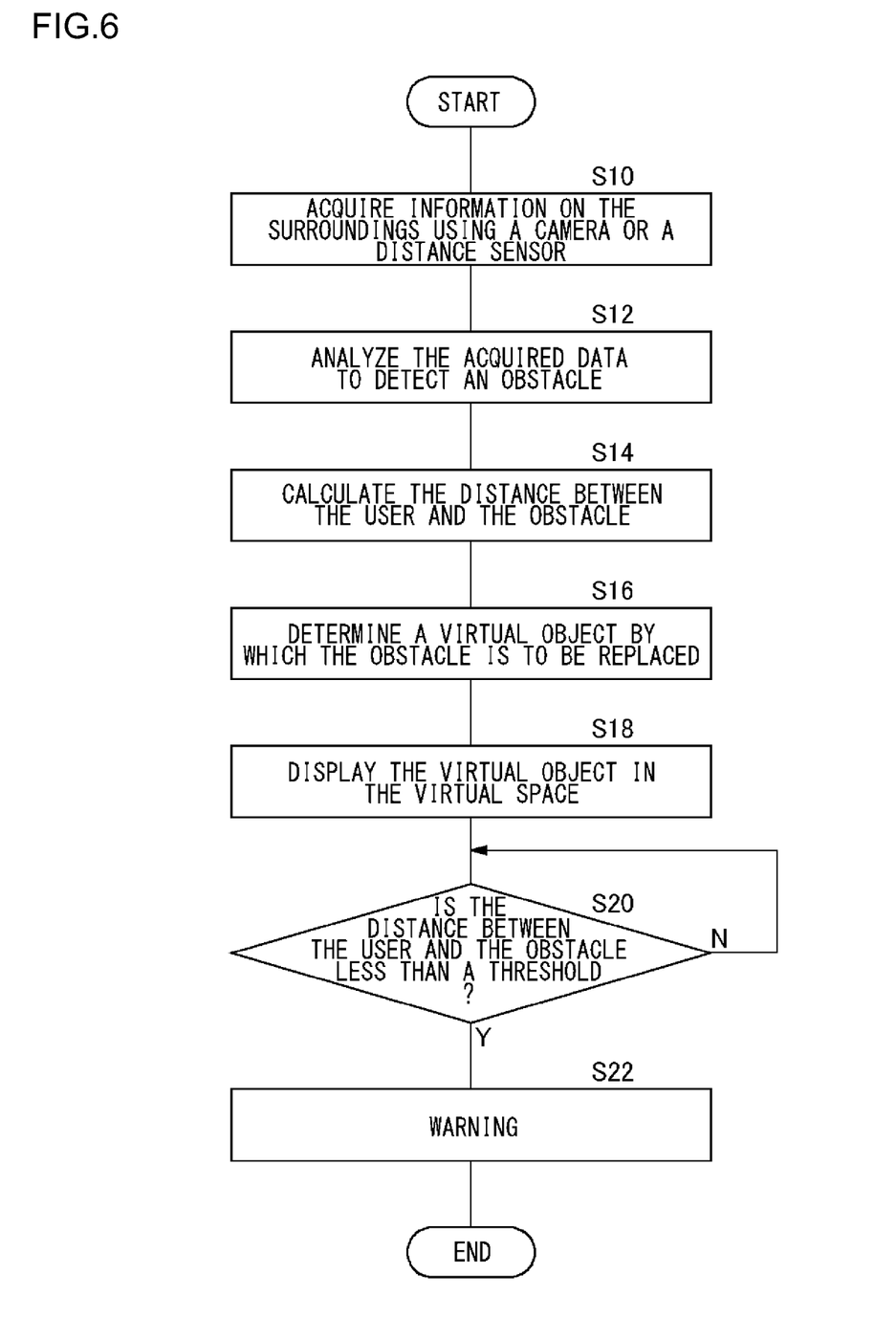
FIG. 6 is a flowchart that shows a procedure of obstacle avoidance performed by the obstacle avoidance apparatus shown in FIG. 5.
Figure 7:
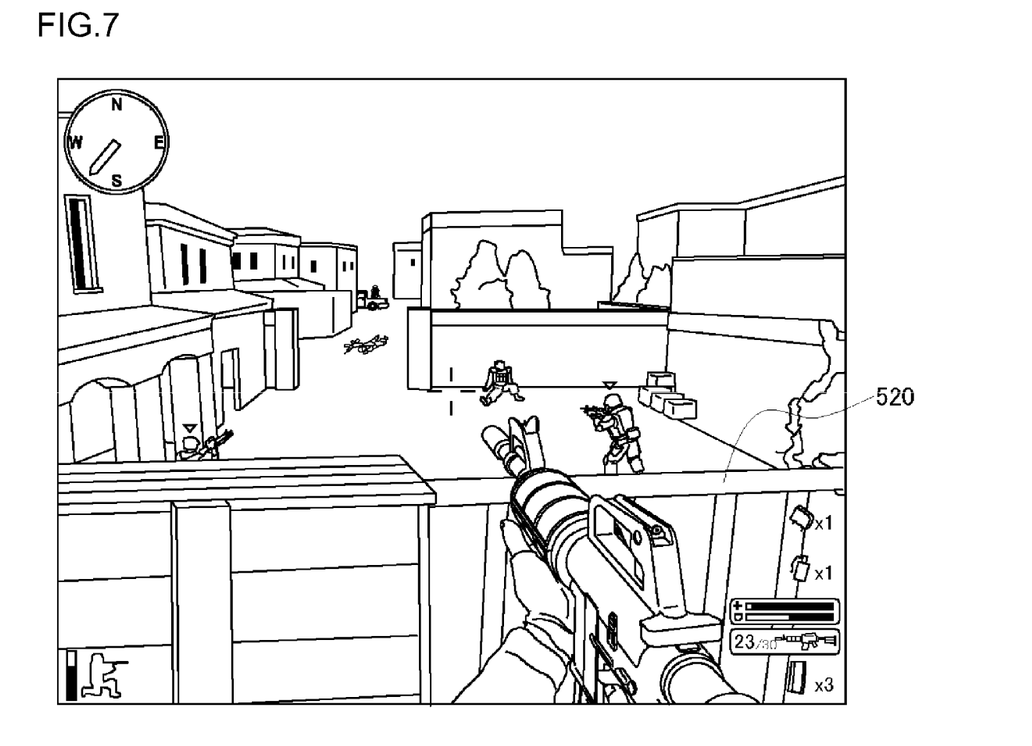
FIG. 7 is a diagram for describing an exemplary virtual object displayed on a head mounted display to avoid an obstacle.
Figure 8:
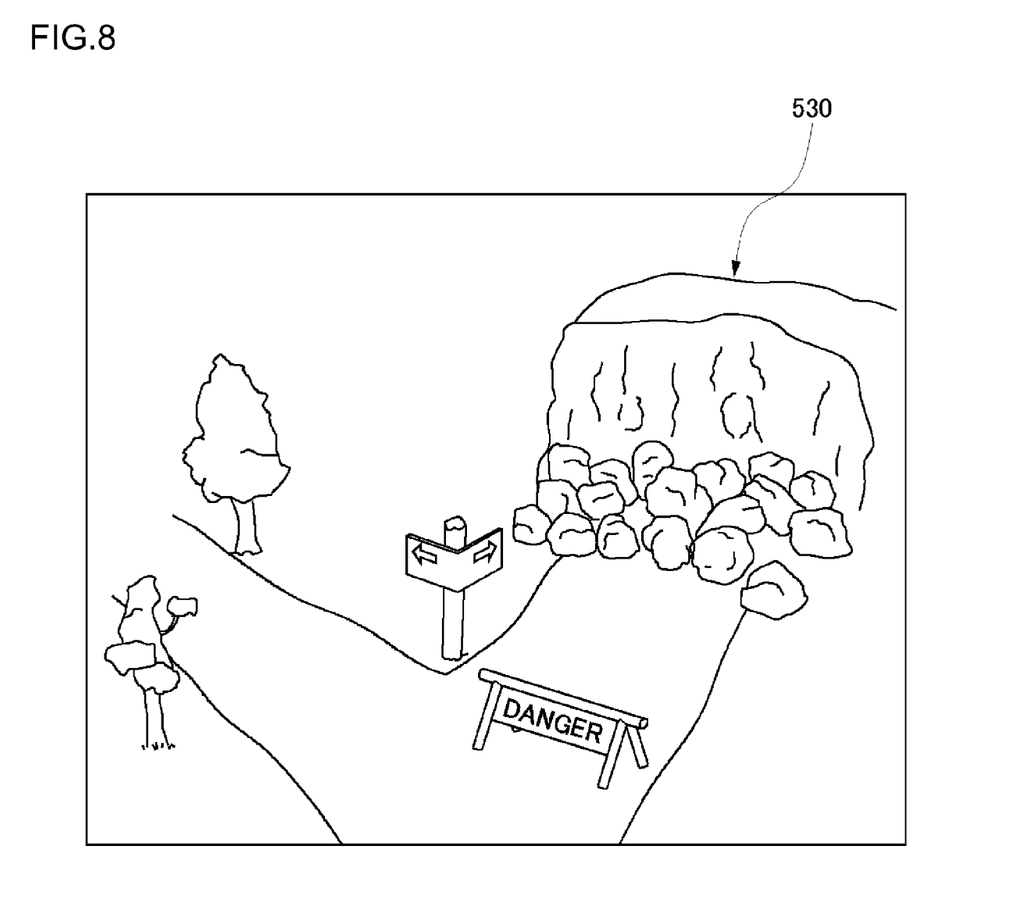
FIG. 8 is a diagram for describing another exemplary virtual object displayed on a head mounted display to avoid an obstacle.

FIG. 6 is a flowchart that shows a procedure of obstacle avoidance performed by the obstacle avoidance apparatus 600. FIGS. 7 and 8 are diagrams for describing exemplary virtual objects displayed on the head mounted display 100 to avoid obstacles.

Information on the user's surroundings is acquired using a camera or a distance measuring sensor mounted on the head mounted display 100 worn by the user (S10). The obstacle detecting unit 610 then analyzes the acquired image data to detect an obstacle (S12). Also, the distance calculating unit 620 uses depth information of the object acquired by the distance measuring sensor to calculate the distance between the user and the obstacle (S14).

The obstacle replacing unit 630 determines the type of a virtual object by which the obstacle detected by the obstacle detecting unit 610 is to be replaced (S16). The virtual object is an object that is not unnatural in the content displayed on the head mounted display 100 and that a user tries to avoid bumping into. The virtual object synthesizing unit 640 generates the virtual object within the virtual space and displays the composite image on the head mounted display 100 (S18).

In the example of FIG. 7, a user wearing the head mounted display 100 is playing a shooting game, using the controller 310 as a rifle. If there is an obstacle right in front of the user's body, a fence 520 as a virtual object replacing the obstacle will be displayed right in front of the user's rifle within the virtual space in the game so that the user will not thrust the controller 310 forward or move the user's body forward. Accordingly, the user will naturally operate the controller 310 corresponding to a rifle before the fence 520, so as to avoid operating the controller 310 beyond the fence 520, or the obstacle.

In the example of FIG. 8, a user wearing the head mounted display 100 is playing a role-playing game, using the controller 310 to operate a character and exploring the virtual space. If there is an obstacle ahead of the user on the right, a collapsed cliff 530 will be displayed as a virtual object on the path leading toward the right and a virtual sign saying "Danger" will also be displayed before the path so that the user will not thrust a hand or move the body forward toward the right.

If the game is a sports game, such as a bowling game, a tennis game, and a table tennis game, the playing area may be restricted or a foul line may be provided according to the position of an obstacle. Also, the game application may control the game play so that the tennis ball or the like does not reach to a position corresponding to the position of a real obstacle, thereby preventing the user from bumping into the obstacle. In some board games, a user wearing the head mounted display 100 himself or herself moves as a game piece. In such a case, the game application may create the squares of the board game so that any square is not arranged in a position corresponding to the position of a real obstacle, thereby preventing the user from bumping into the obstacle.

When the obstacle is a movable object such as a human or an animal, the obstacle replacing unit 630 selects a movable object, such as an avatar or a robot, as a virtual object by which the obstacle is replaced, and the virtual object synthesizing unit 640 generates within the virtual space a movable object that moves according to the movement of the real obstacle.

The warning unit 650 determines whether or not the distance between the user and an obstacle is less than a threshold (S20) and, if the distance is less than the threshold (Y at S20), the warning unit 650 will warn the user with sound issued by the head mounted display 100, a text displayed on the head mounted display 100, the vibration of the controller 310, and the like (S22). In a game, a warning against getting closer to an obstacle may be indirectly given to the user by providing a disadvantage in the game, such as the score being reduced or the character being endangered when the character gets closer to a virtual object provided as an obstacle.

The present invention has been described with reference to the embodiment. The embodiment is intended to be illustrative only, and it will be obvious to those skilled in the art that various modifications to constituting elements or processes could be developed and that such modifications also fall within the scope of the present invention.

What is claimed is:

1. An obstacle avoidance apparatus, comprising:
    circuitry configured to determine a user's position as the user moves throughout a real space;
    circuitry configured to generate a fictitious, virtual space that a user views through a head mounted display (HMD), where the virtual space includes images of landscape, scenery, and objects of a fictitious space based, at least in part, on the user's position acquired as the user moves throughout the real space, and does not include images of landscape, scenery, or objects of a real space within which the user is located;
    circuitry configured to detect a real obstacle from an image of the real space within which the user is located;
    circuitry configured to generate a virtual object in response to the detection of the real obstacle by generating the virtual object in such a way as to be: (i) consistent with context established by the landscape, scenery, and objects of the fictitious, virtual space that the user is experiencing through the HMD, and (ii) a different kind of object than, and is not recognizable by the user as representing, the real obstacle of the real space within which the user is located; and
    circuitry configured to locate the virtual object within the fictitious, virtual space displayed on the HMD.

2. The obstacle avoidance apparatus according to claim 1, wherein the image of the outside world is captured by a camera mounted on the HMD.

3. The obstacle avoidance apparatus according to claim 1, wherein the circuitry configured to generate the virtual object such that the user wearing the HMD is expected to avoid contact with the virtual object in the fictitious virtual space, thereby avoiding contact with the real obstacle in the real space within which the user is located.

4. The obstacle avoidance apparatus according to claim 3, wherein, when the detected real obstacle is a movable object, the obstacle generating unit selects, as the virtual object, an object that moves within the fictitious, virtual space displayed on the HMD.

5. The obstacle avoidance apparatus according to claim 1, further comprising
    circuitry configured to calculate the distance from the detected real obstacle to the user wearing the HMD,
    wherein the circuitry configured to locate displays the virtual object at a position within the fictitious, virtual space determined according to the distance from the real obstacle to the user wearing the head mounted display.

6. The obstacle avoidance apparatus according to claim 5, further comprising circuitry configured to warn the user when the distance to an obstacle calculated by the distance calculating unit is less than a predetermined threshold.

7. An obstacle avoidance method, comprising:
    determining a user's position as the user moves throughout a real space;
    generating a fictitious, virtual space that a user views through a head mounted display (HMD), where the virtual space includes images of landscape, scenery, and objects of a fictitious space based, at least in part, on the user's position acquired during the step of determining the user's position as the user moves throughout the real space, and does not include images of landscape, scenery, or objects of a real space within which the user is located;
    detecting a real obstacle from an image of the real space within which the user is located;
    generating a virtual object in response to the detection of the real obstacle by generating the virtual object in such a way as to be: (i) consistent with context established by the landscape, scenery, and objects of the fictitious, virtual space that the user is experiencing through the HMD, and (ii) a different kind of object than, and is not recognizable by the user as representing, the real obstacle of the real space within which the user is located; and
    locating the virtual object within the fictitious, virtual space displayed on the HMD.

8. A non-transitory, computer readable storage medium containing an embedded computer program, which when executed by a computer, causes the computer to carry out actions, comprising:
    determining a user's position as the user moves throughout a real space;
    generating a fictitious, virtual space that a user views through a head mounted display (HMD), where the virtual space includes images of landscape, scenery, and objects of a fictitious space based, at least in part, on the user's position acquired during the determining the user's position as the user moves throughout the real space, and does not include images of landscape, scenery, or objects of a real space within which the user is located;
    detecting a real obstacle from an image of the real space within which the user is located;
    generating a virtual object in response to the detection of the real obstacle by generating the virtual object in such a way as to be: (i) consistent with context established by the landscape, scenery, and objects of the fictitious, virtual space that the user is experiencing through the HMD, and (ii) a different kind of object than, and is not recognizable by the user as representing, the real obstacle of the real space within which the user is located; and
    locating the virtual object within the fictitious, virtual space displayed on the HMD.

9. The obstacle avoidance method according to claim 7, wherein the image of the outside world is captured by a camera mounted on the HMD.

10. The obstacle avoidance method according to claim 7, further comprising generating the virtual object such that the user wearing the HMD is expected to avoid contact with the virtual object in the fictitious virtual space, thereby avoiding contact with the real obstacle in the real space within which the user is located.

11. The obstacle avoidance method according to claim 10, wherein, when the detected real obstacle is a movable object, the method further comprises selecting, as the virtual object, an object that moves within the fictitious, virtual space displayed on the HMD.

12. The obstacle avoidance method according to claim 7, further comprising
    calculating the distance from the detected real obstacle to the user wearing the HMD; and
    displaying the virtual object at a position within the fictitious, virtual space determined according to the distance from the real obstacle to the user wearing the head mounted display.

13. The obstacle avoidance method according to claim 12, further comprising warning the user when the distance to an obstacle calculated is less than a predetermined threshold.

* * * * *